United States Patent [19]
Curry et al.

[11] Patent Number: 6,085,983
[45] Date of Patent: *Jul. 11, 2000

[54] TRANSACTION SYSTEM AND METHOD

[75] Inventors: Stephen M. Curry; Michael L. Bolan, both of Dallas, Tex.

[73] Assignee: Dallas Semiconductor Corporation, Dallas, Tex.

[*] Notice: This patent is subject to a terminal disclaimer.

[21] Appl. No.: 09/022,290

[22] Filed: Feb. 11, 1998

Related U.S. Application Data

[63] Continuation of application No. 08/757,352, Nov. 27, 1996, Pat. No. 5,760,385, which is a continuation of application No. 08/247,941, May 24, 1994, Pat. No. 5,604,343.

[51] Int. Cl.[7] .................................................... G06K 19/06
[52] U.S. Cl. ............................................ 235/492; 235/441
[58] Field of Search ..................................... 235/492, 437, 235/441, 382, 385, 487, 486, 375, 380

[56] References Cited

U.S. PATENT DOCUMENTS

| | | | |
|---|---|---|---|
| 5,666,412 | 9/1997 | Handelman et al. | 380/4 |
| 5,760,385 | 6/1998 | Curry et al. | 235/492 |
| 5,832,090 | 11/1998 | Raspotnik | 380/24 |
| 5,859,419 | 1/1999 | Wynn | 235/487 |

*Primary Examiner*—Thien M. Le
*Attorney, Agent, or Firm*—Jenkens & Gilchrist

[57] ABSTRACT

A secure monetary system comprises an electronic module and equipment to access the electronic module. The electronic module comprising a substantially token-shaped module and secure memory circuitry to store monetary information. The secure memory positioned in the substantially token-shaped module. The equipment accesses and manipulates the monetary information stored in the memory in the electronic module. The equipment comprises memory to store control and encryption programs and the memory is coupled to a microprocessor, which is also coupled to the electronic module and a control panel. The microprocessor is secure.

4 Claims, 4 Drawing Sheets

TRANSACTION SYSTEM AND METHOD

This application is a continuation of application Ser. No. 08/757,352 filed on Nov. 27, 1996 (issued as U.S. Pat. No. 5,760,385), which is a continuation of application Ser. No. 08/247,941 filed on May 24, 1994 (issued as U.S. Pat. No. 5,604,343).

PARTIAL WAIVER OF COPYRIGHT PURSUANT TO 1077 O.G. 22 Mar. 20, 1987.

(C) Copyright, Dallas Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

This application hereby incorporates by reference the following co-assigned issued patents and patent applications, which describe in great detail the operation of the technology surrounding Touch Memory™ processes and systems, which was developed by employees at and/or assigned to Dallas Semiconductor Corporation:

| Serial No./ Patent No. | Filing Date/ Issue Date | DSC Case No. | Authors |
| --- | --- | --- | --- |
| 4,862,310 | 04-29-88/08-29-89 | DSC-77 | Harrington |
| 5,210,846 | 05-15-89/05-11-93 | DSC-83 | Lee |
| 08/019,932 | 02-19-93 | DSC-83A | Lee |
| 4,982,371 | 05-15-89/01-01-91 | DSC-85 | Lee et al. |
| 07/632,227 | 12-20-90 | DSC-85A | Lee et al. |
| 5,091,771 | 05-15-89/11-18-91 | DSC-86 | Bolan et al. |
| 4,972,377 | 05-15-89/11-20-90 | DSC-107 | Lee |
| 5,191,554 | 08-27-91/03-02-93 | DSC-107A | Lee |
| 5,181,091 | 09-16-91/01-19-93 | DSC-153A | Harrington et al. |
| 4,945,217 | 05-15-89/07-31-90 | DSC-157 | Bolan |
| 5,025,141 | 07-17-90/06-18-91 | DSC-157A | Bolan |
| 4,948,954 | 05-15-89/08-14-90 | DSC-158 | Dias |
| 4,983,820 | 08-14-90/01-08-91 | DSC-158A | Dias |
| 5,045,675 | 05-15-89/09-03-91 | DSC-159 | Steve Curry |
| 4,995,004 | 05-15-89/02-19-91 | DSC-160 | Lee |
| 07/657,717 | 02-19-91 | DSC-160A | Lee |
| 07/725,793 | 07-09-91 | DSC-175 | Curry et al. |
| 07/998,978 | 12-30-92 | DSC-175A | Curry et al. |
| 07/527,492 | 05-22-90 | DSC-268 | Bolan et al. |
| 5,206,905 | 11-19-90/04-27-93 | DSC-303 | Lee et al. |
| 07/615,615 | 11-19-90 | DSC-304 | Lee et al. |
| 5,226,137 | 11-19-90/07-06-93 | DSC-305 | Lee et al. |
| 07/882,244 | 05-08-92 | DSC-306 | Lee |
| 07/631,929 | 12-19-90 | DSC-316 | Curry et al. |
| 07/728,230 | 07-10-91 | DSC-317 | Pearson et al. |
| 07/727,618 | 07-10-91 | DSC-319 | Williams et al. |
| 07/727,619 | 07-10-91 | DSC-322 | Rodriguez et al. |
| 07/727,638 | 07-10-91 | DSC-324 | Ni et al. |
| 08/103,724 | 08-09-93 | DSC-352 | Pearson et al. |
| 07/727,639 | 07-10-91 | DSC-353 | Bolan et al. |
| 5,166,545 | 07-10-91/11-24-92 | DSC-356 | Harrington |
| 08/022,258 | 02-24-93 | DSC-377 | Bolan et al. |
| 08/031,776 | 03-15-93 | DSC-377A | Bolan et al. |
| 08/015,506 | 02/09/93 | DSC-393 | Harrington et al. |
| 08/234,210 | 04/28/94 | DSC-427 | Fekete et al. |

This application also hereby incorporates by reference the following co-assigned issued patents and patent applications, which describe in great detail the operation of the technology surrounding the DS5000 and DS5002 microprocessor processes and systems, which was also developed by employees at and/or assigned to Dallas Semiconductor Corporation:

| Serial No./ Patent No. | Filing Date/ Issue Date | DSC Case No. | Authors |
| --- | --- | --- | --- |
| 4,857,767 | 8/15/89 | DSC-59 | Little et al. |
| 5,237,699 | 8/17/93 | DSC-60 | Little et al. |
| 4,908,790 | 3/13/90 | DSC-61 | Little et al. |
| 07/714,973 | 6/13/91 | DSC-63 | Little et al. |
| 4,947,477 | 8/07/90 | DSC-64 | Little et al. |
| 4,890,263 | 12/26/89 | DSC-79 | Little |
| 4,885,716 | 12/05/89 | DSC-79 | Little |
| 07/573,585 | 08/27/90 | DSC-124 | Grider et al. |
| 08/174,584 | 12/28/93 | DSC-124A | Grider et al. |
| 4,168,396 | 09/18/79 | DSC-169 | Best |
| 4,278,837 | 07/14/81 | DSC-170 | Best |
| 4,319,079 | 03/09/82 | DSC-171 | Best |
| 4,433,207 | 02/21/84 | DSC-172 | Best |
| 4,465,901 | 08/14/84 | DSC-173 | Best |

In addition, Applicants also incorporate by reference the data sheet for the DS1982, which is included in the Appendix A, the data sheet for DS5002, which is included in the Appendix B, and the Book of DS199x Touch Memory™ Standards and Book of DS19xx Touch Memory™ Standards, which are both published by and available from Dallas Semiconductor Corporation.

FIELD OF INVENTION

The present invention relates to electronic devices, and, more particularly, to portable semiconductor circuits used to store monetary equivalent data.

BACKGROUND

Numerous examples and applications of monetary equivalent data exist in today's society. For example, the fare payment system used by the Bay Area Rapid Transit (hereafter referred to as "BART") system in San Francisco is an example of an application in which monetary equivalent data is read and written electronically. In this system, the user can obtain a transit ticket and deposit any desired amount of money into it from an automatic vending machine. The information is stored in the ticket magnetically in the form of encoded data written on a magnetic stripe. Each time the user travels from one place to another, the system deducts the fare from the amount represented by the magnetically encoded data, thus, reducing the value of the ticket. When the value of the ticket is nearly exhausted, it can be restored to a high value by inserting it again into an automatic vending machine and depositing additional funds.

The BART system eliminates the need for handling money and making change at the point of entry to the transit system, thereby reducing labor costs and increasing efficiency.

A similar advantage can be realized in many other circumstances where an electronically readable and alterable "token" can eliminate the costs and delays associated with money handling at the point of use. Such a token might therefore be used as a meal ticket on a college campus, as a ride ticket at an amusement park, or wherever tickets or tokens are now used to speed monetary payments and/or eliminate unnecessary labor.

The system described above, however, suffers from at least three significant disadvantages. First, paper tickets with magnetic stripes deposited on them are subject to wrinkling or tearing which can cause loss of the monetary equivalent data. Also, the magnetic stripes are subject to erasure by environmental magnetic fields, even if the paper carrier and magnetic material are physically intact. Second, since magnetic recording is a read/write technology, it is possible for a technologically sophisticated person to read the contents of the magnetic stripe when the ticket has a large monetary value, use the ticket until the value is nearly gone, then rewrite the original data into the ticket to restore its original value. It is not necessary for the person to understand the encoding of the monetary data in order to do this. Therefore, the use of a read/write technology makes the tickets vulnerable to counterfeiting. Third, the magnetic recording technology requires uniform motion of the magnetic material across the read/write heads in order to read and write data reliably. This makes it necessary to use a relatively complex mechanical ticket-handling mechanism to read, debit, and rewrite the monetary equivalent data.

SUMMARY OF THE INVENTIONS

A secure monetary system comprises an electronic module and equipment to access the electronic module. The electronic module comprising a substantially token-shaped module and secure memory circuitry to store monetary information. The secure memory positioned in the substantially token-shaped module. The equipment accesses and manipulates the monetary information stored in the memory in the electronic module. The equipment comprises memory to store control and encryption programs and the memory is coupled to a microprocessor, which is also coupled to the electronic module and a control panel. The microprocessor is secure.

The disclosed systems and processes preferably incorporating Add-Only Touch Memory™ technology described above has the following special characteristics which make it uniquely suitable for applications requiring secure crediting, debiting, and portable storage of monetary equivalent data. First, a unique, unalterable registration number which allows the data on each different part to be encrypted differently. This makes it impossible to determine how to counterfeit a part by studying how data is written into a different part. Second, random-access memory which in one-way alterable, that is, having bits that can be changed from a one to a zero but not from a zero back to a one. This makes it impossible to write into a part the data pattern it held earlier when it was more valuable. (This type of memory is commonly referred to as one-time-programmable EPROM, but this terminology is misleading in the current application because it suggests that the part can be written only once.) Third, a small, durable Touch Memory™ package with a simple electrical connection, allowing data to be read or written with a momentary contact.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figure 1:
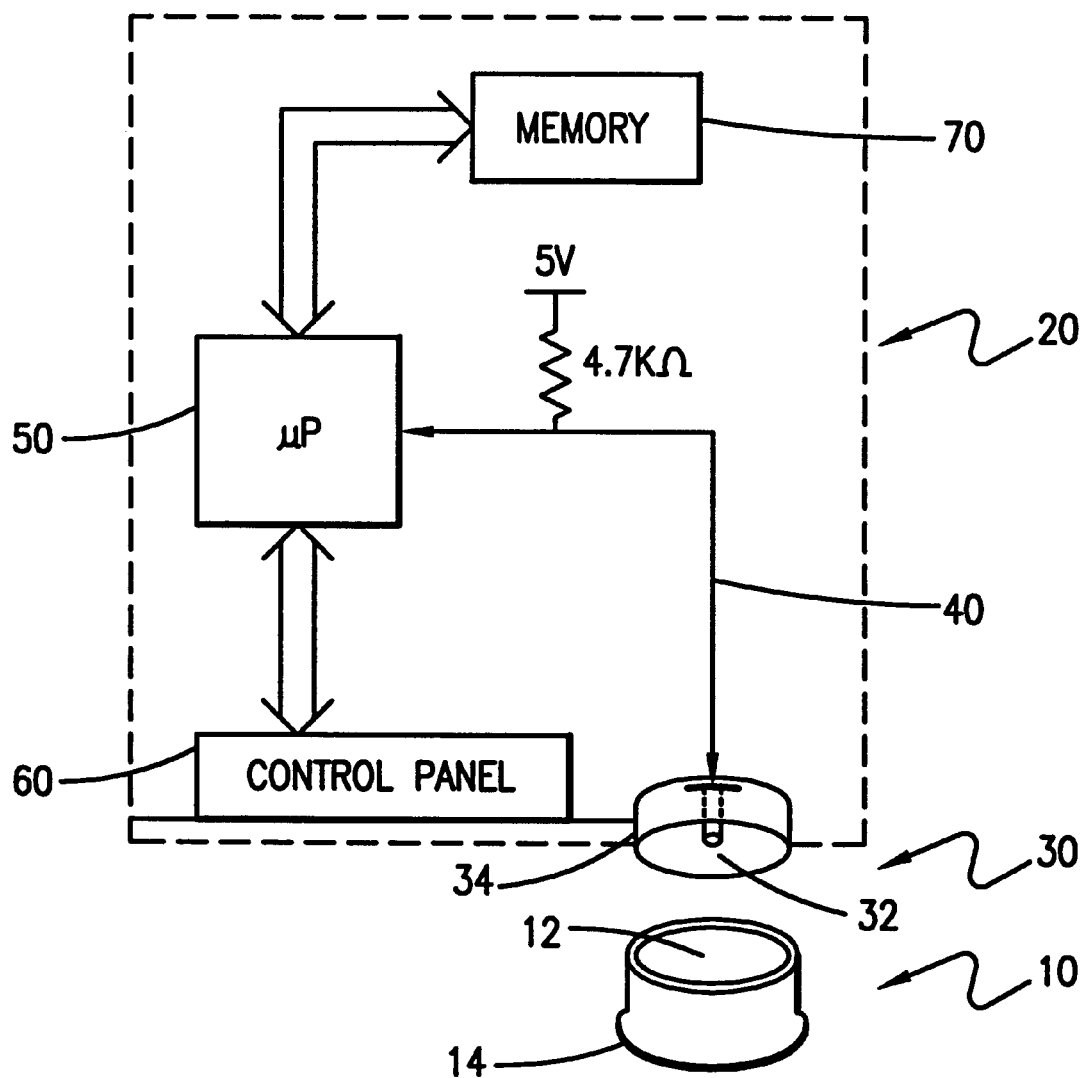
FIG. 1 is an overall block diagram of the preferred architecture of a preferred embodiment of the invention, which generally comprises Add-Only Touch Memory™ electronic module 10, which can be electrically coupled to "tollgate" or "add-fare" equipment 20 (which can exist independently of one another or in a combined piece of equipment)

FIG. 1 is an overall block diagram of the preferred architecture of a preferred embodiment of the invention, which generally comprises Add-Only Touch Memory™ module 10, which can be electrically coupled to "tollgate" or "add-fare" equipment 20 (which can exist independently of one another or in a combined piece of equipment). In general, please note that electronic module 10 houses memory circuitry that stores the monetary information. The monetary information is accessed via probe 30, which transfers information to and from the circuitry in electronic module 10 to microprocessor 50, which, in turn, interprets the information and transfers information to memory 70, control panel 60, and even back to electronic module 10. Memory stores encrypted control and data information in a standard software format understandable and executable by microprocessor 50. Microprocessor 50 is preferably secure. Control panel 60 preferably has a keypad and/or a mechanism to generate information corresponding to money it received and counted (e.g., dollar bills, quarters, etc.), which it transfers to be interpreted by microprocessor 50. Microprocessor 50, memory 70 and control panel 60 are readily available in the marketplace and well understood by those skilled in the art. As described below, however, preferred embodiments do utilize specific microprocessors 50. As explained below, FIG. 1 shows the basic architecture of equipment 20, which may be used to increment and/or decrement electronic module 10, which store the monetary equivalent information.

Electronic modules 10, such as Add-only Touch Memory™ electronic modules, such as the DS1982, are currently manufactured by Dallas Semiconductor Corporation (the data sheet of which is incorporated by reference hereinabove and included in Appendix A hereinbelow) provide a viable alternative technology for the storage of monetary equivalent data which delivers the advantages described above but does not suffer form the disadvantages. As described, inter alia, in U.S. Pat. No. 5,210,846 and related applications (DSC-83); pending patent application having Ser. Nos. 07/725,793 (DSC-175), 08/022,258 (DSC- 377), and 08/234,210 (DSC-427), a Touch Memory™ electronic module 10 is comprised of circuitry that is sealed in a durable stainless steel microcan (as shown in FIG. 1 and in the data sheet), which protects it against environmental damage (e.g., bending, wrinkling, getting wet, etc.). Reading and writing data to the circuitry contained in the microcan is accomplished with a momentary contact of the first and second conductive surfaces to a simple electrical probe 30, which is also described, inter alia, in U.S. Pat. No. 5,210,846 and related applications (DSC-83); pending patent application having Ser. Nos. 07/725,793 (DSC-175), and 08/022,258 (DSC-377) and do not require sophisticated mechanical handling mechanisms. As described in the patents and applications incorporated above, especially pending patent application having Ser. No. 08/234,210 (DSC-427), the stainless steel microcan preferably comprises a first conductive surface 12 and second conductive surface 14 that are electrically isolated from one another. The first conductive surface 12 and the second conductive surface 14 when combined form a cavity to house an integrated circuit mounted on a small printed circuit board. Circuitry embedded in the integrated circuit communicates to the outside world (outside the microcan) via the first and second conductive surfaces 12 and 14. Probe 30 preferably consists of a first conductive contact 32 and second conductive contact 34. The center portion or first conductive contact is preferably connected to a conductive path 40 (e.g., a single wire in preferred embodiments), which is electrically couples the first conductive contact 32 to port pin on microprocessor 50, which executes the necessary protocol to interact with Add-Only Touch Memory™ electronic module 10 via conductive path 40. As shown in FIG. 1, conductive path 40 preferably has a pull-up resistor of 4.7K ohms to a 5 volt supply to boost any signal sent. Second conductive contact 34 is grounded to provide a complete circuit between microprocessor 50 and Add-Only Touch Memory™ electronic module 10 when being accessed (e.g., read or written to). Note that while conductive path 40 is shown independent from control panel 60, it is possible to integrate probe 30 and conductive path 40 into control panel 60. As described in the attached data sheet entitled DS1982, the add-only attribute or feature of Add-Only Touch Memory™ electronic module 10 provides protection against counterfeiting, since the data in these memories can never be restored to its original value once it has been modified.

Add-Only Touch Memory™ electronic module 10 contains many bits of information in the circuitry embedded therein, with each bit having either a one or a zero value. Initially, all the bits in the memory are ones. The read/write probe 30, which is described above, can read these bits and transfer this information to microprocessor 50 and it can also selectively change one or more of the bits to zero. Once a bit has been changed to a zero, it cannot be changed back to a one. Writing a bit is therefore much like punching a hole in a meal ticket card. The electrically alterable bits are preferably organized into memory pages having 256 bits each. In addition to these electrically alterable bits, each Touch Memory™ electronic module 10 also contains a unique 64 bit registration number which cannot be altered, which is explained in great detail, inter alia, in pending patent application having Ser. No. 07/725,793 (DSC-175). Dallas Semiconductor Corporation guarantees that no two Touch Memory™ electronic modules 10 ever have the same registration number. Finally, each page has a status register described in the DS1982 data sheet can be read to determine which pages have been used up, and error detection circuitry (hereafter referred to as "CRC") which allows the reader to determine if it has read the data correctly, which is also explained in great detail, inter alia, in pending patent application having Ser. Nos. 07/725,793 (DSC-175) and in the DS1982 datasheet in Appendix A. As a result, with this feature set, preferred system embodiments allow monetary equivalents, which are represented by bit values of 1's and 0's, to be added to or removed from the part many times before it must be replaced, and which is highly resistant to counterfeiting. The basic principle of this system is described below.

The following discussion describes electronic crediting and debiting of Add-Only Touch Memory™ electronic modules 10. A first preferred embodiment implements electronic crediting and debiting of Add-Only Touch Memory™ electronic modules 10 as follows.

Monetary units are added by changing one ("1") bits to zero ("0") bits starting from the least significant bit of each page (e.g., PAGES 1–4) of memory in Add-Only Touch Memory™ electronic module 10 and progressing toward to the most significant bit. Similarly, monetary units are debited by changing one bits to zero bits starting from the most significant bit of each page and progressing toward the least significant bit. As the memory in electronic module 10 is repeatedly debited and credited, the rows of zero bits grow toward the middle of the page. When they meet, the page is marked as exhausted with the status byte and the process continues on the next page of memory. (It is possible to ignore pages and treat the entire memory as a single page, but that would require the reading of the entire memory, increasing the time needed to complete a transaction. The electronic read/write process is more efficient when only a portion of the stored data needs to be read.) With this technique, assuming the credit units and debit units have equal value, a 1024 bit memory could credit and debit 512 monetary units before it was used up. If credit units are taken to represent some multiple of the debit unit, then more debits are allowed. (For example, if each credit unit is the equivalent of three debit units, then a 1024 bit memory would allow 768 debits.).

The problem with the first preferred embodiment is that anyone with the necessary knowledge and equipment to read and write data in Add-Only Touch Memory™ electronic module 10 can easily increase the value by adding additional credit units. This is possible because there is a direct, straightforward correspondence between a bit location and its value.

However, if the bits were scrambled (permuted) in an apparently random manner, as implemented in a second preferred embodiment, it would no longer be possible to determine how to add credit units to the memory in Add-Only Touch Memory™ electronic module 10. For example, if 15 bits on a page are still set to one, only one of these bits will add a credit unit to the memory. Similarly, only one of the bits will add a debit unit to the memory. If any one of the other 13 bits were written to zero, it would appear out of sequence and would signify that the memory had been tampered with, thereby invalidating it. Therefore, if a person guesses which bit to write next, he has one chance in 15 of adding a credit unit, one chance in 15 of adding a debit unit (decreasing the value), and 13 chances in 15 of invalidating the memory and flagging it as having been subject to tampering. Although there is a chance of guessing correctly which bit to change, the laws of probability are stacked against this event. For example, this kind of statistical analysis makes lotteries predictable.

Figure 2:
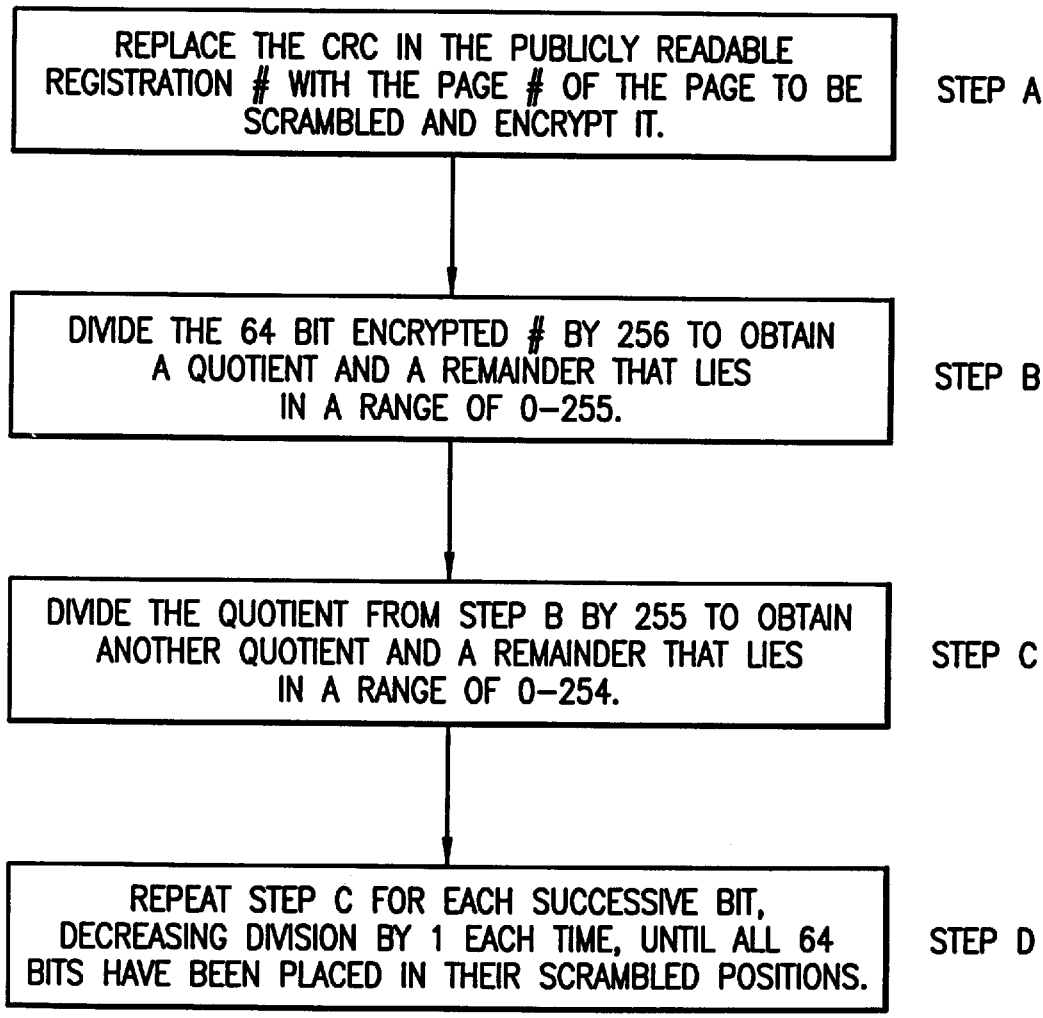
FIG. 2 is a flow chart showing a preferred process to calculate bit permutations from unique registration numbers stored by circuitry in electronic module 10 (in FIG. 1), which is preferably implemented in software stored in memory 70 and executed by microprocessor 50 in equipment 20.

The unique registration number in each Touch Memory™ electronic module 10, as described above, can be used to permute the bits in each part differently, so that one cannot determine by studying the data in one part how to add credit units to a different part. While many different techniques are possible to determine a unique bit permutation from the unique registration number supplied with each part, the preferred techniques are described below. First, the number of different permutations of the 256 bits in each page is very large, approximately ten to the power of 507. Only a minute fraction of these permutations can be enumerated with the unique registration number, since the registration number represents a range of 281 trillion unique numerical values, or about ten to the power of 14. The permutations that can be derived from the unique registration number are thus buried in the much larger population of possible permutations. 281 trillion is in fact an extremely large set of unique registration numbers that is sufficient for all practical purposes. The enormously larger number of different permutations greatly multiplies the task of deducing the permutations from the registration number. To select a permutation based on the registration number from this enormous population, the following method could be used. Referring to FIG. 2, the steps are as follows:

A) replace the CRC in the publicly readable registration number with the page number of the page to be scrambled and then encrypt it with a standard block encryption algorithm (such as the Data Encryption Standard ("DES"), which is well known by those in the art), using a secret encryption key, which produces a 64 bit encrypted number which is unique to each page of each part and is known only to the reader;

B) divide the 64 bit encrypted number by 256 to obtain a quotient and a remainder that lies in the range 0–255- the value of the remainder gives the position of bit 1 in the scrambled data, and leaves 255 other bit positions unfilled;

C) divide the quotient from step B by 255 to obtain another quotient and a remainder that lies in the range 0–254, which the value of this remainder gives the position of bit 2 in the remaining 255 bits that were unfilled after step B; and D) repeat step C for each successive bit, decreasing the divisor by 1 each time, until all 64 bits have been placed in their scrambled positions—each time the quotient reaches zero during this process, replace it with the original encrypted number from step A.

The steps B–D above are numerically intensive and may not be suitable for microcontroller-based equipment. As result, an alternate preferred scrambling technique which could be used by the second preferred embodiment utilizes a simpler but less secure technique is to start with an initial, secret, randomly chosen permutation and then further permute it based on the 64 bit encrypted number by interchanging certain bits or not depending on whether a bit in the encrypted number is a one or a zero. This method provides a simpler set of permutations, but may still provide adequate security in many applications. The complexity of the technique used to derive permutations from the unique registration number can be selected based on the degree of security needed in the application and the amount of computing power available in the equipment.

Figure 3A:
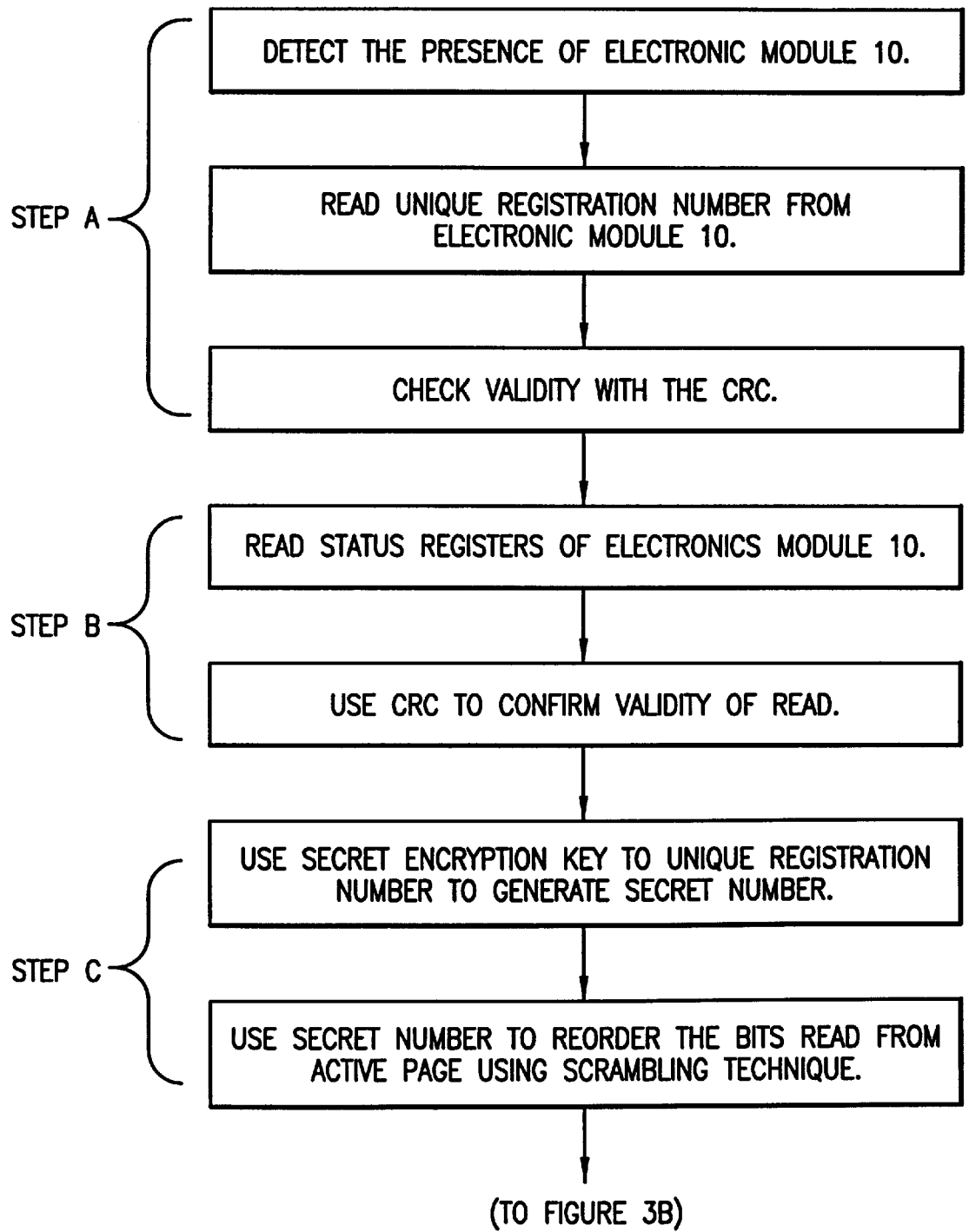
FIGS. 3A and 3B is a flow chart showing a preferred operation used to debit or decrease the value stored in memory in electronic module 10 by one monetary unit, which is preferably implemented in software stored in memory 70 and executed by microprocessor 50 in equipment 20.
Figure 3B:
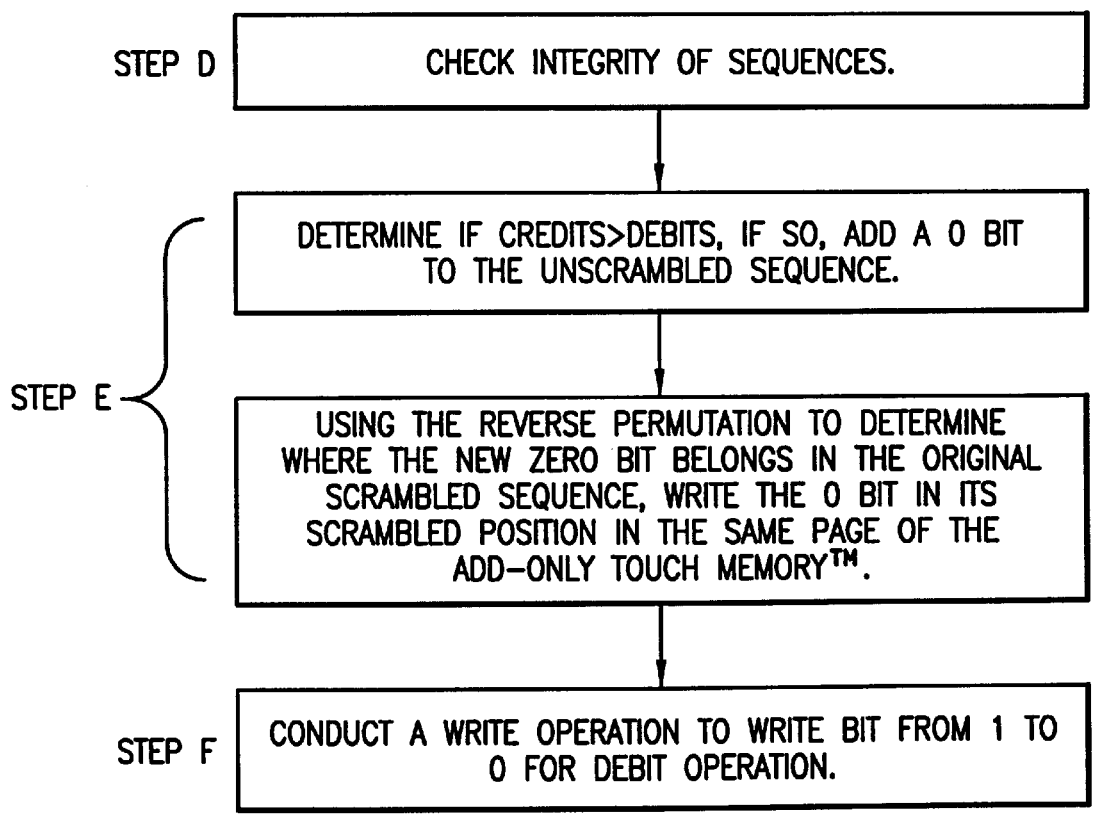

Referring to FIGS. 3A and 3B, regarding a description of the overall operation of the second preferred embodiment, using the scrambling methods and systems described above, the automatic debiting equipment operates as follows to decrease the value of the memory by one monetary unit:

A) the equipment 20 detects the presence of an Add-Only Touch Memory™ electronic module 10 in probe 30 by means of the presence pulse that it generates, reads the unique registration number, and checks its validity with the CRC;

B) the equipment 20 reads the status registers of an Add-Only Touch Memory™ electronic module 10 inserted in probe 30 to find the first page that has not been used up and then reads that page, making use of the built-in CRC calculation circuitry to confirm the validity of the read;

C) using a secret encryption key that can be changed periodically, equipment 20 applies a standard encryption algorithm (such as DES) to the unique registration number (with the CRC replaced with the active page number) to generate a unique secret number, and then uses this number to reorder the bits read from the active page using any of the scrambling techniques described above;

D) after the above reordering, the zero bits starting from the least significant bit represent credits, and the zero bits starting from the most significant bit represent debits (As a result, the monetary data, beginning with the least significant bit, should therefore appear as an unbroken sequence of zero bits (credits), followed by an unbroken sequence of one bits (not yet used), followed by an unbroken sequence of zero or more zero bits (debits). The equipment 20 checks the integrity of these three sequences. If there is a break in any of these sequences or if the number of debits exceeds the number of credits, then there is evidence of tampering and the equipment 20 may take appropriate action (such as recording the registration number, or even sounding an alarm or summoning an official);

E) if the number of credits is greater than the number of debits, the equipment 20 adds one more zero bit to the unscrambled sequence, checks to make sure that the page has not been used up, and then uses the bit permutation in reverse to determine where the debit bit falls in the original scrambled bit sequence (Any time a page is filled, the equipment 20 writes the status bytes to mark the page in memory in electronic module 10 as used up and proceeds to the next page.); and F) the equipment 20 performs a write operation to write the bit identified in step E above from a one to a zero, then reads back the page to make sure that the write operation was completed correctly—when a successful write of the debit bit is detected, the equipment 20 activates a peripheral device (passenger gate, etc.) to signal a completed, successful operation.

The operation of equipment 10 if used to credit is similar to that described above. However, please not the following differences. The crediting equipment receives cash from the user, which is tabulated by control panel 60 and the information is communicated to microprocessor 50) and sets one or more credit bits to zero to indicate the amount of added value. When a page in memory in electronic module 10 is half full of credit bits, the equipment proceeds to the next page to add additional credits. The bits are written in the scrambled order so that it is impossible to distinguish the credit bits from the debit bits and the bits that have not yet been used.

Both the debiting and crediting equipment can make use of a secure microprocessor 50 (such as the DS5002 secure micro which is manufactured by Dallas Semiconductor Corporation—a data sheet of which is incorporated by reference and shown in Appendix B), so that even if equipment 20 is stolen, misplace, or otherwise removed from a secure location (e.g., an amusement park or bus terminal), it cannot be made to reveal the secret encryption key which is used in step C above. This makes it possible to limit the knowledge of this information to a very small number of individuals. It is important to note that a blank Add-Only Touch Memory™ electronic module 10 has no monetary value until it has been credited with monetary equivalents using its unique bit scrambling algorithm. Therefore, there is no advantage to a counterfeiter to obtain a supply of blank Add-Only Touch Memory™ electronic module 10, and it is unnecessary to take special precautions to safeguard these supplies. While the DS5002 is preferred, Add-Only Touch Memory™ electronic module 10 can provide a one-wire™ interface with a standard port pin of virtually any commercially available microprocessor (e.g, Intel 8051), so that a single wire can be connected between a port pin of a DS5002 used as microprocessor 50 to provide conductive path 40 between microprocessor 50 and Add-Only Touch Memory™ electronic module 10. Alternatively, microprocessor 50 is preferably a rugged, inexpensive, and industrial microprocessor.

Assuming that a high-performance processor is used so that the time required to perform the calculations described above can be neglected, the minimum time required for a debiting transaction is the time required to read the unique registration number, read the status bytes, read the appropriate page, and write out the bit that represents the debit. This time, equal to 31.7 milliseconds, is scarcely perceptible and would be regarded as essentially instantaneous by the user.

Further Modifications and Variations

The preferred embodiments may be modified in many ways while retaining one of more of the features of a the monetary equivalent system. For example, while the scrambling techniques described above are preferably implemented in software stored in memory 70 and executed by microprocessor 50, it is well within the scope of the invention to design a hardware equivalent to execute the same functionality. In addition, while each functional blocks shown in FIG. 1 (microprocessor 50, circuitry driving control panel 60, and memory 70) are preferably integrated in an integrated circuit in a multi-chip embodiment, it is possible that one or more functional blocks could be combined into a single integrated circuit. Similarly, it is not necessary that any of the functional blocks discussed above be implemented in an integrated circuit, except where particular applications demand it (e.g., for speed purposes or size limitations).

Moreover, alternate methods and systems can be used to provide an interface between Add-only Touch Memory™ electronic module 10 and microprocessor 50. For instance, a three-wire interface could be used. In other words, Add-Only Touch Memory# electronic module 10 can be comprised of more than two conductive surfaces (e.g., three conductive surfaces isolated from one another). Circuitry provided in circuitry embedded in Add-Only Touch Memory™ electronic module 10 exists to provide a three-wire interface. Once again, the potential three wire interface is described in great detail in the patents and patent applications incorporated above. Finally, note that while the mass transit example was used in the background, the application of the inventions described hereinabove are not only limited to mass transit applications. The technology described hereinabove can be used in any application using monetary equivalent data. For instance, but not by way of limitation, applications would include gambling chips, meal tickets, amusement rides, and season tickets to sporting events or concerts, etc.

Attachment A

For instance, start with an initial, secret permutation, and then apply successively a different, additional, secret permutation for each bit of the encrypted number, but only if the bit has a value of one.

We claim:

1. A transaction system, comprising:
   (a) means for storing value information;
   (b) means for encrypting said value information to generate encrypted value information;
   (c) means for manipulating said encrypted value information; and
   (c) means for interfacing said value information storing means with said manipulating means.

2. The transaction system as recited in claim 1, wherein said value information comprises postage unit information.

3. The transaction system as recited in claim 1, wherein said interfacing means comprises a probe electrically connected to said manipulating means.

4. The transaction system as recited in claim 3, wherein said probe comprises a first and a second conductive contact.

* * * * *